US012349239B1

(12) United States Patent
Li

(10) Patent No.: US 12,349,239 B1
(45) Date of Patent: Jul. 1, 2025

(54) HEATER

(71) Applicant: Xusheng Li, Shandong (CN)

(72) Inventor: Xusheng Li, Shandong (CN)

( * ) Notice: Subject to any disclaimer, the term of this patent is extended or adjusted under 35 U.S.C. 154(b) by 0 days.

(21) Appl. No.: 18/961,752

(22) Filed: Nov. 27, 2024

(30) Foreign Application Priority Data

May 20, 2024 (CN) ......................... 202421096353.1

(51) Int. Cl.
*H05B 3/00* (2006.01)
*H05B 1/02* (2006.01)
*H05B 3/06* (2006.01)

(52) U.S. Cl.
CPC ........... *H05B 3/0038* (2013.01); *H05B 1/023* (2013.01); *H05B 3/06* (2013.01)

(58) Field of Classification Search
CPC ............ H05B 2203/03; H05B 2213/07; H05B 3/0019; H05B 3/141; H05B 3/145; H05B 3/146; H05B 3/56; H05B 3/80
USPC ........ 219/218, 386, 400, 512, 521; 329/392, 329/368, 376, 384, 385
See application file for complete search history.

(56) References Cited

U.S. PATENT DOCUMENTS 1,958,007 A * 5/1934 Macdougall .......... F24H 3/0417 392/354
2,492,774 A * 12/1949 Wild ..................... F24H 3/0417 219/544
7,013,080 B1 * 3/2006 Kaplanis ................. F24C 7/065 392/376
7,089,834 B2 * 8/2006 Reynertson ............. B25B 23/14 81/479
2012/0137896 A1 * 6/2012 Zhan .................... A47J 37/0611 99/374
2023/0081223 A1 * 3/2023 Pease .................... F24H 3/0417 392/365

OTHER PUBLICATIONS

Yeonsik, 20190065970 (Year: 2019).*

* cited by examiner

*Primary Examiner* — Vy T Nguyen
(74) *Attorney, Agent, or Firm* — Daniel M. Cohn

(57) ABSTRACT

The present disclosure provides a heater. The heater includes a heating device and a control assembly. The control assembly is rotatably arranged on the heating device. Since the control assembly can rotate independently, even if an angle of the control assembly is changed after a rotation of the heating device, the user can adjust the angle of the control assembly independently. In this way, it can be ensured that the control assembly faces the user, so as to facilitate the user to regulate and operate the control assembly.

19 Claims, 11 Drawing Sheets

HEATER

FIELD

The present disclosure relates to the field of heating device, and in particular to a heater.

BACKGROUND

For healthy growth of poultry and pets, it is crucial to provide a growth environment with a suitable temperature for them. In a breeding process, people usually use a heater to create a comfortable environment. The heater heats and warms by means of thermal radiation. In order to adapt to various usage situations, heating devices in existing heaters are usually rotatably arranged so that a heating face of a heating device can irradiate towards the poultry or pets. Moreover, the heater is usually arranged with a control assembly for controlling the heating device, and users can control a temperature of the heating device through the control assembly.

However, the control assembly of existing heaters is fixedly arranged on the heating device. When the heating device rotates, the control assembly also rotates along with the heating device, resulting in changes in position and angle of the control assembly, which is inconvenient for the user to control.

SUMMARY

The present disclosure provides a heater. The heater includes a heating device and a control assembly. The control assembly is rotatably arranged on the heating device.

BRIEF DESCRIPTION OF THE DRAWINGS

To provide a clearer illustration of the technical solutions in the embodiments of the present disclosure or in the prior art, a brief introduction will be given to the drawings used in the description of the embodiments or the prior art. It is obvious that the drawings described below are merely some embodiments of the present disclosure, and for those skilled in the art, other drawings can be obtained based on these drawings without creative efforts.

Figure 1:
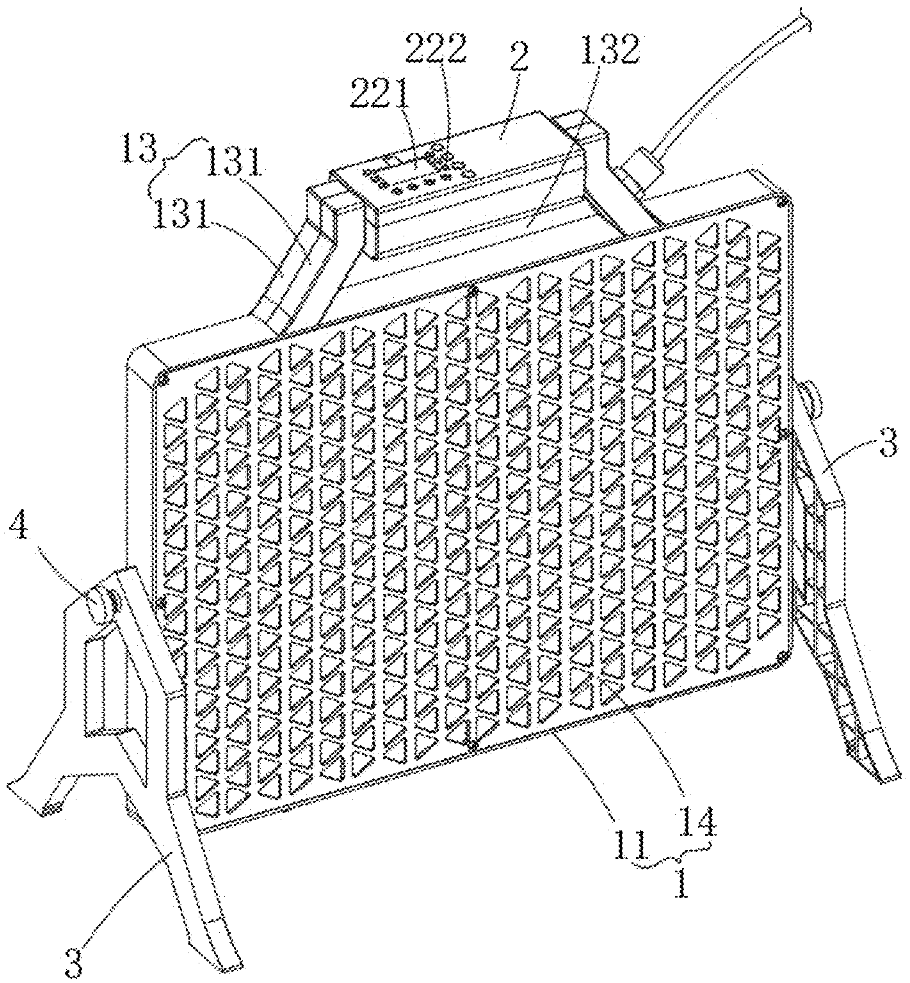
FIG. 1 is a first schematic view of an overall structure of a heater according to an embodiment of the present disclosure, showing a heating device in a first state.

REFERENCE NUMERALS IN THE DRAWINGS heating device 1, first rotation axis 10, housing 11, heat-generating element 12, supporting arm 13, separator 14, blowing element 15, second limiting structure 111, second wire-passing hole 112, heating cavity 113, hanging hole 114, hanging boss 115, mounting hole 121, ventilation hole 122, connecting cover 131, gripping space 132, opening 1131, gap 1132, insertion hole 1151, connecting hole 1301, avoidance space 1302, connecting cavity 1311, connecting notch 1312, inner wall 13021 corresponding to the avoidance space 1302, second limiting boss 13022;

control assembly 2, second rotation axis 20, rotating shell 21, control element 22, connecting shaft boss 211, first limiting structure 212, first wire-passing hole 213, display panel 221, control button 222, flange 2111, first limiting boss 2112;

bracket 3;

angle adjusting member 4, first end 41, second end 42.

DETAILED DESCRIPTION

Unless otherwise defined, all technical and scientific terms used herein have the same meaning as commonly understood by those skilled in the art to which the present disclosure belongs. The terms used in the description of the present disclosure herein are intended for describing particular embodiments only and are not intended to limit the present disclosure. In the description, claims, and the above drawings of the present disclosure, the terms "including" and "having", as well as their variants, are intended to convey a non-exclusive inclusion. The terms "first", "second", etc., as used herein, are intended to distinguish between different objects, rather than to describe a particular order.

Reference to "embodiments" herein implies that a particular feature, structure, or characteristic described in conjunction with an embodiment may be included in at least one embodiment of the present disclosure. The appearance of the phrase at various places in the specification does not necessarily refer to the same embodiment, nor is it a separate or an alternative embodiment that is mutually exclusive of other embodiments. One skilled in the art would explicitly and implicitly understand that the embodiments described herein can be combined with other embodiments.

In order to enable those skilled in the art to better understand the technical solutions of the present disclosure, the technical solutions in the embodiments of the present disclosure will be clearly and completely described below with reference to the accompanying drawings.

Referring to FIGS. 1-11, a heater is provided in the present disclosure. The heater includes a heating device 1 and a control assembly 2. The heating device 1 has a heating face. The heating device 1 is rotatable and has a first state in which the heating face is vertical and a second state in which the heating face is horizontal. The control assembly 2 is rotatably arranged on the heating device 1. The control assembly 2 is arranged with a control element 22. The control element 22 is electrically connected to the heating device 1. The control element 22 may be at least one of a display panel 221 and a control button 222. The display panel 221 may be a touch-screen or a digital display screen. The display panel 221 is mainly used for displaying a heating temperature of the heater. The control button 222 is used for adjusting the heating temperature of the heater.

Figure 11:
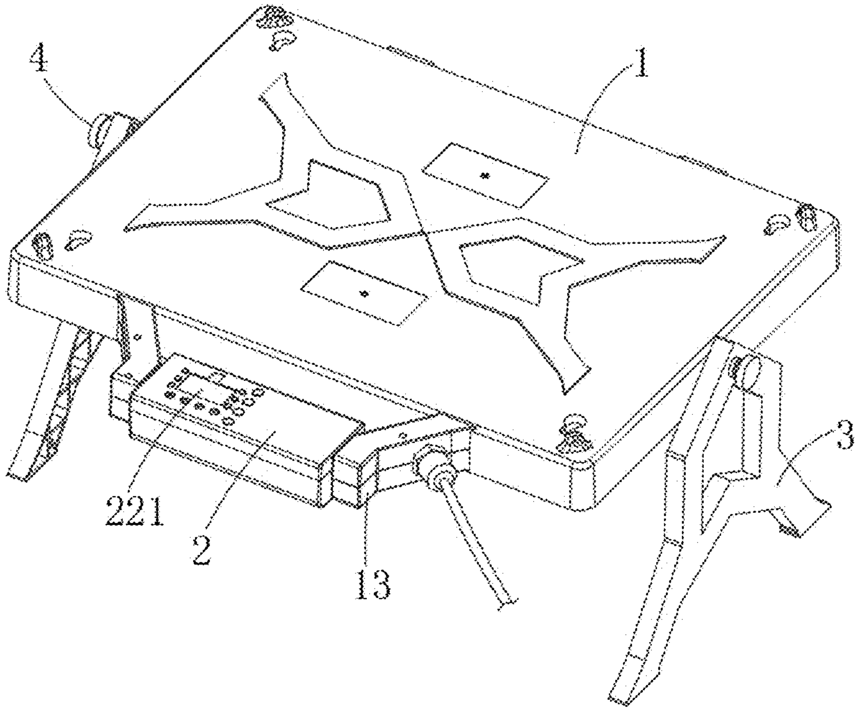
FIG. 11 is a schematic view of the heating device in a second state according to an embodiment of the present disclosure.

Therefore, the control assembly 2 in this embodiment can rotate independently. Even if an angle of the control assembly 2 is changed after a rotation of the heating device 1, the user can adjust the angle of the control assembly 2 independently. For example, when the heating device 1 is in the first state, the display panel 221 and/or the control button 222 is horizontally arranged and faces upward, as shown in FIG. 1. When the heating device 1 is in the second state, the display panel 221 and/or the control button 222 may face forward with the rotation of the heating device 1. However, the user can rotate the control assembly 2 by himself, so that the display panel 221 and/or the control button 222 is horizontally arranged and faces upward again, as shown in FIG. 11. For the heater, it can be ensured that the control assembly 2 faces the user, in other words, the display panel 221 and/or the control button 222 of the control assembly 2 can be rotated to a position that is convenient for observation and operation, so as to facilitate the user to observe, regulate, and operate the control assembly 2.

Figure 3:
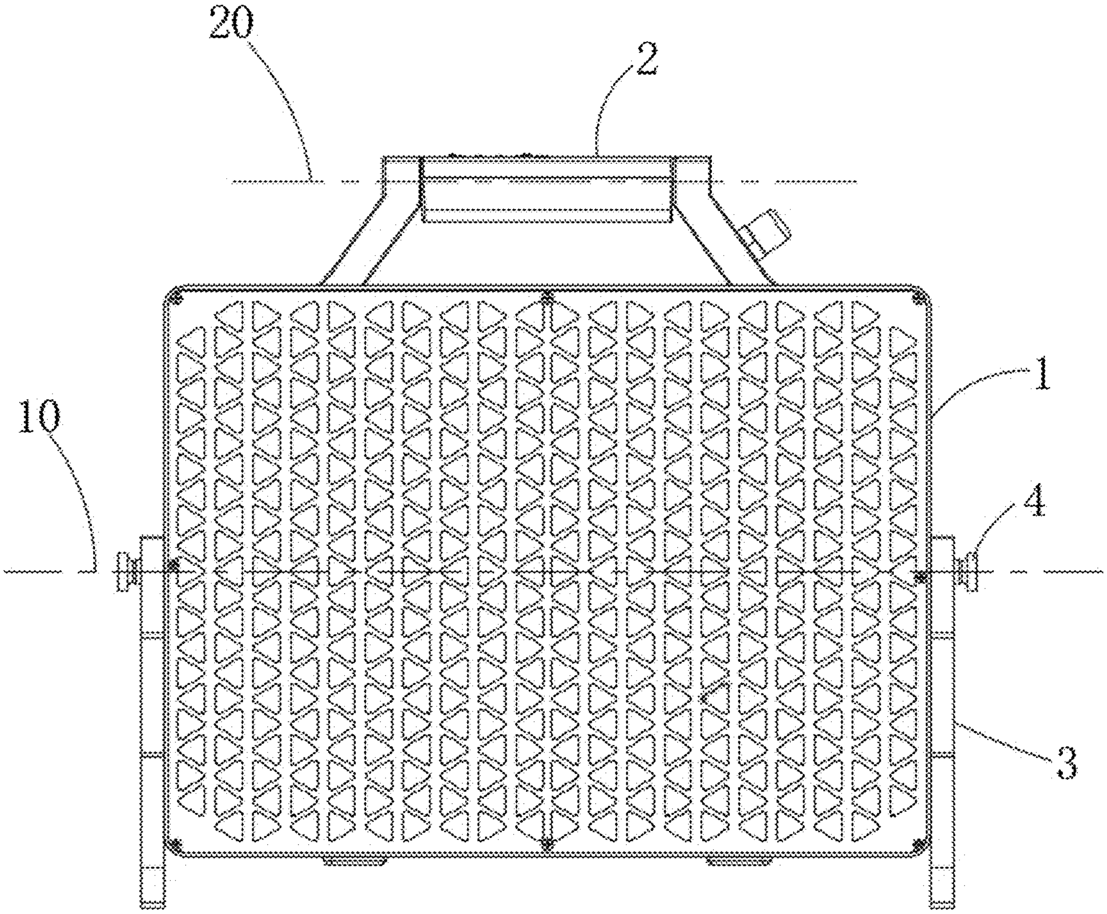
FIG. 3 is a third schematic view of the overall structure of the heater according to an embodiment of the present disclosure, showing a first rotation axis and a second rotation axis.

Specifically, as shown in FIG. 3, the heating device 1 has a first rotation axis 10. The heating device 1 rotates about the first rotation axis 10. The control assembly 2 has a second rotation axis 20. The control assembly 2 rotates about the second rotation axis 20. The second rotation axis 20 is parallel to the first rotation axis 10. The second rotation axis 20 and the first rotation axis 10 are horizontally arranged. Of course, in another embodiment, the first rotation axis 10 can be horizontally arranged, and the second rotation axis 20 can be perpendicular to the first rotation axis 10, while the another embodiment is not shown in the accompanying drawings.

Regarding a rotating structure between the control assembly 2 and the heating device 1, as shown in FIGS. 4-7, the control assembly 2 includes a rotating shell 21 and the control element 22 arranged on the rotating shell 21. The rotating shell 21 is arranged with a connecting shaft boss 211 extending in a length direction of the rotating shell 21. An axis of the connecting shaft boss 211 forms the second rotation axis 20. The heating device 1 opens a connecting hole 1301. The connecting shaft boss 211 is rotatably located in the connecting hole 1301.

Furthermore, in order to prevent the control assembly 2 from being detached from the heating device 1, in this embodiment, an avoidance space 1302 is defined in the heating device 1. The connecting hole 1301 is communicated with the avoidance space 1302. An end of the connecting shaft boss 211 far away from the rotating shell 21 is arranged with a flange 2111. The flange 2111 extends along a circumferential direction of the connecting shaft boss 211. The flange 2111 is located in the avoidance space 1302 and can abut against an inner wall 13021 corresponding to the avoidance space 1302, thereby preventing the connecting shaft boss 211 from being pulled out of the connecting hole 1301.

Additionally, the rotating shell 21 is arranged with a first limiting structure 212, and the heating device 1 is arranged with a second limiting structure 111. The first limiting structure 212 can be mated and connected with the second limiting structure 111 to limit a rotation angle of the connecting shaft boss 211. In an example, the control assembly 2 can only rotate within a range of 180 degrees. In this way, a problem of internal cable winding caused by the control assembly 2 rotating multiple circles can be effectively prevented.

Specifically, the first limiting structure 212 is a first limiting boss 2112 arranged in the circumferential direction of the connecting shaft boss 211, and the second limiting structure 111 is a second limiting boss 13022 arranged in the avoidance space 1302. The first limiting boss 2112 can abut against the second limiting boss 13022. In addition, the second limiting structure 111 can also be arranged in other forms. For example, a groove may be defined around the connecting hole 1301 in the inner wall 13021 corresponding to the avoidance space 1302, the first limiting boss 2112 is located in the groove, and the second limiting boss 13022 is formed in the groove.

Figure 2:
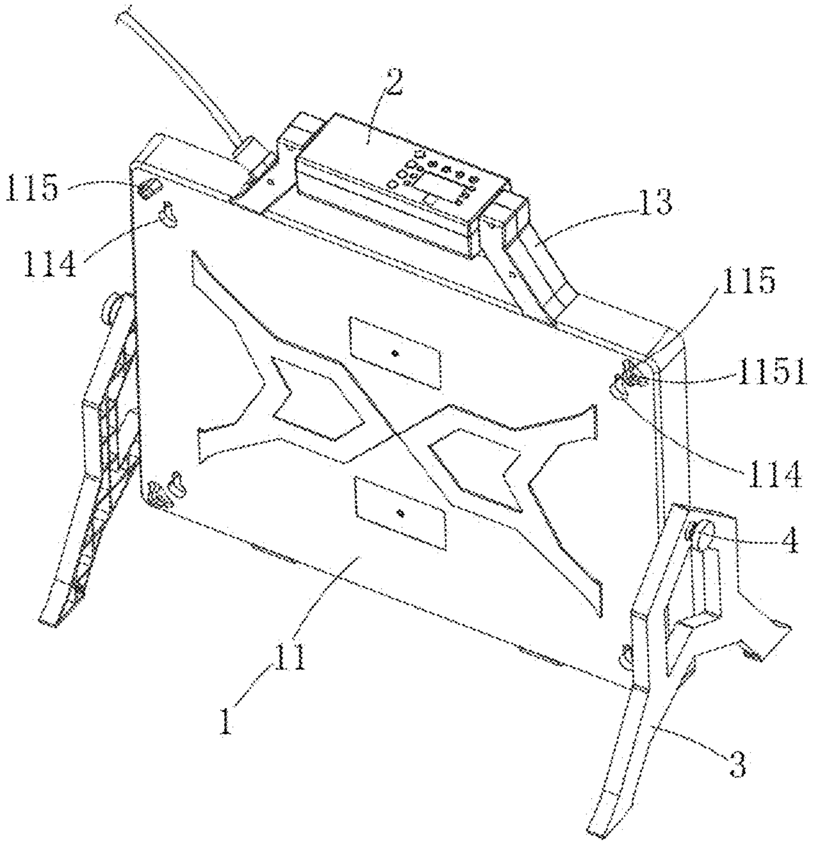
FIG. 2 is a second schematic view of the overall structure of the heater according to an embodiment of the present disclosure.
Figure 8:
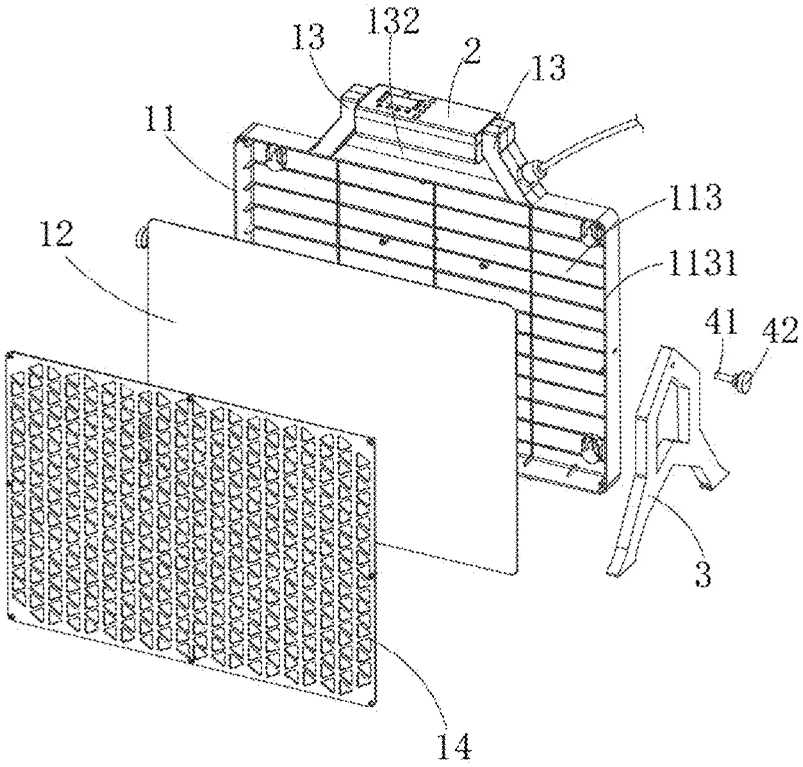
FIG. 8 is an exploded view of the heater according to an embodiment of the present disclosure.

Furthermore, with reference to FIGS. 2 and 8, in the present embodiment, the heating device 1 includes a housing 11, a heat-generating element 12 located in the housing 11, and at least one supporting arm 13 mounted on a periphery of the housing 11. The rotating shell 21 is rotatably mounted on the at least one supporting arm 13. The at least one supporting arm 13 defines the connecting hole 1301 and the avoidance space 1302. The heat-generating element 12 is electrically connected to the control element 22. In an example, a number of the at least one supporting arm 13 is two. Each of the two supporting arms 13 defines the connecting hole 1301 and the avoidance space 1302. Both ends of the rotating shell 21 are arranged with two connecting shaft bosses 211. Particularly, one of the two connecting shaft bosses 211 is located at one end of the rotating shell 21, and the other one of the two connecting shaft bosses 211 is located at the other end of the rotating shell 21. The two connecting shaft bosses 211 are coaxially arranged. One of the two connecting shaft bosses 211 is rotatably connected to one of the two supporting arms 13, and the other of the two connecting shaft bosses 211 is rotatably connected to the other of the two supporting arms 13. In this way, the control assembly 2 is more force-balanced. In this embodiment, the two supporting arms 13 are mainly used to separate the control assembly 2 from the housing 11 and enable the control assembly 2 and the housing 11 to exist independently of each other. The rotating shell 21 is in a shape of a column rod. The rotating shell 21 is arranged between the two supporting arms 13, and thus the rotating shell 21, the two supporting arms 13, and the housing 11 jointly enclose to form a gripping space 132. In other words, the rotating shell 21 can be used as a handle, and the user can hold the rotating shell 21 to lift the heater. Of course, in other embodiments, the rotating shell 21 can also be rotatably mounted on the housing 11 in an embedded manner without the supporting arms 13.

Figure 4:
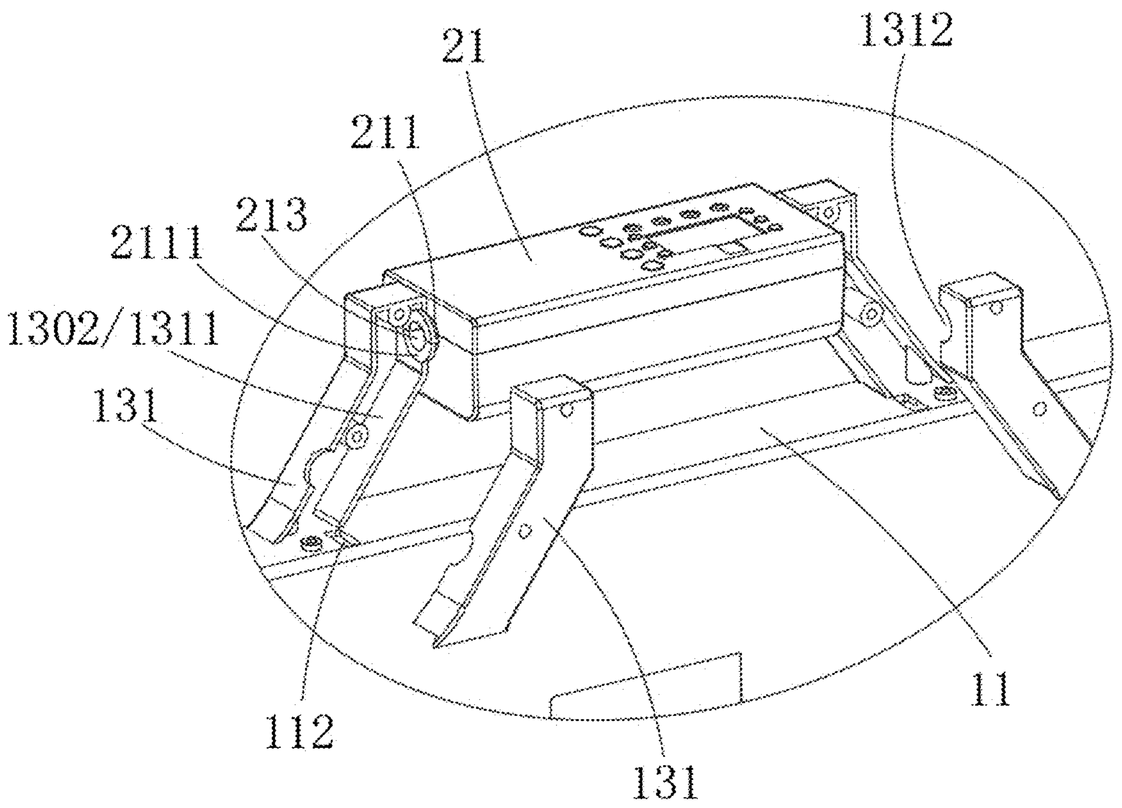
FIG. 4 is a first schematic view of a mounting structure of a rotating shell and a supporting arm according to an embodiment of the present disclosure.
Figure 5:
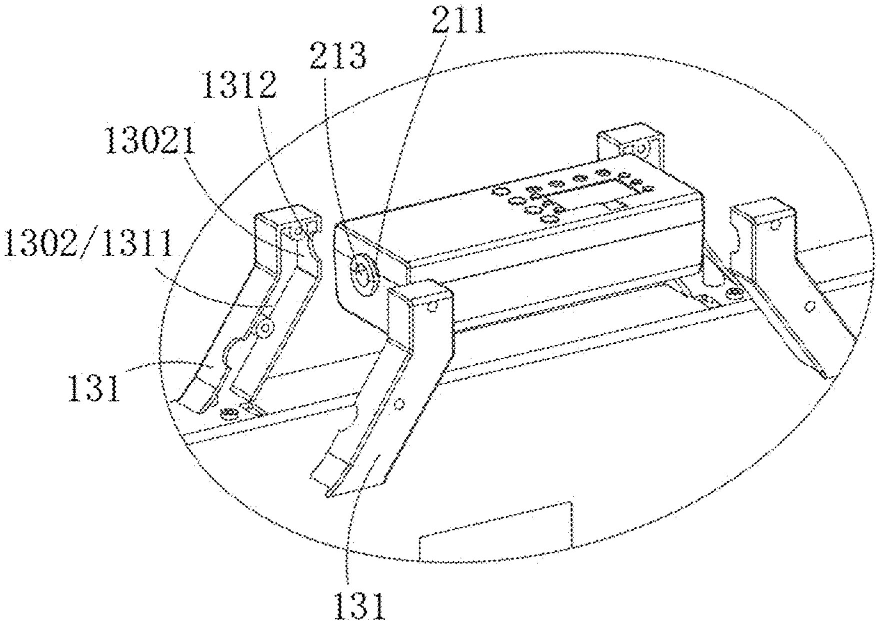
FIG. 5 is a second schematic view of the mounting structure of the rotating shell and the supporting arm according to an embodiment of the present disclosure.
Figure 6:
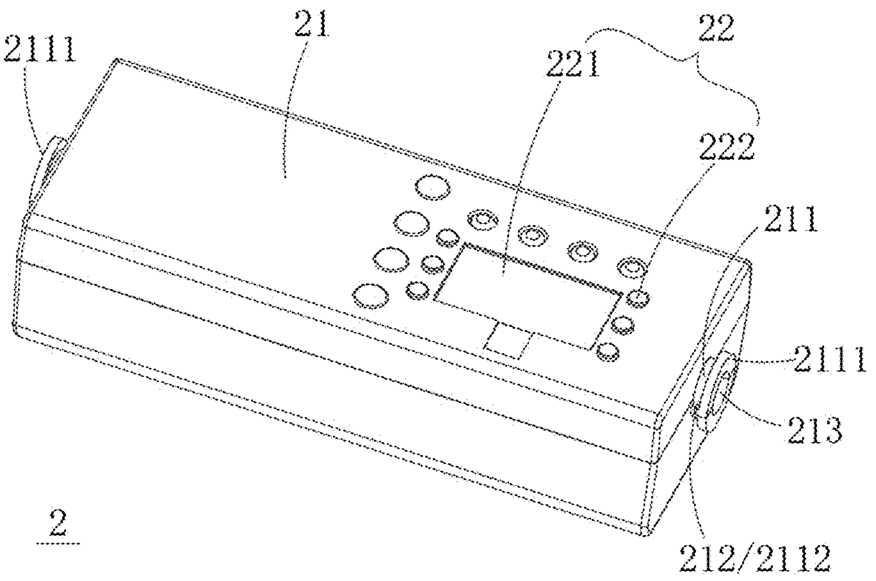
FIG. 6 is a structural view of a control assembly according to an embodiment of the present disclosure.
Figure 7:
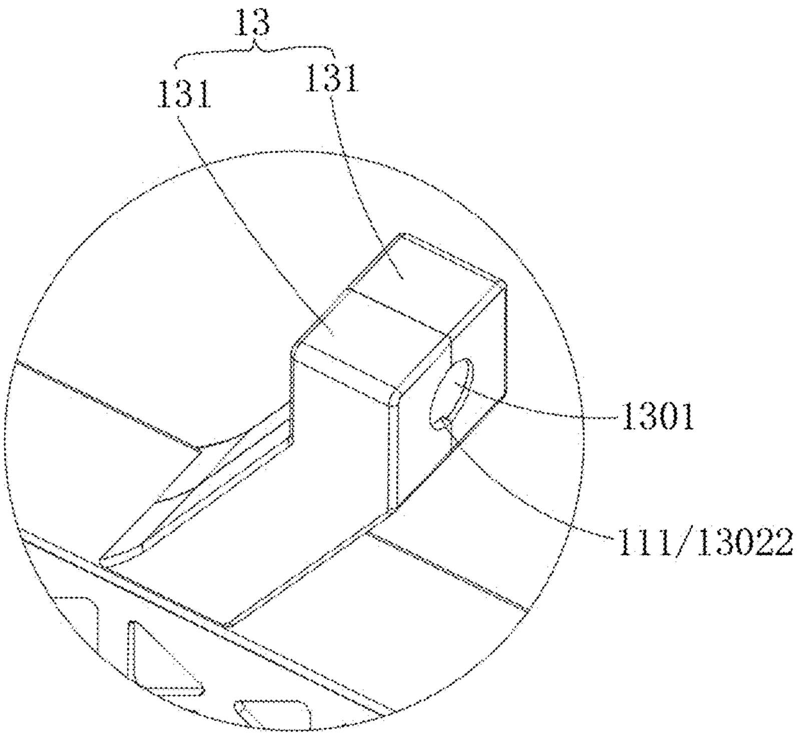
FIG. 7 is a structural view of the supporting arm according to an embodiment of the present disclosure.

In addition, due to the flange 2111, the connecting shaft boss 211 cannot be directly inserted into the connecting hole 1301. As illustrated in FIGS. 4 and 5, in this embodiment, in order to facilitate mounting of the rotating shell 21 and the housing 11, each supporting arm 13 includes two connecting covers 131, and the two connecting covers 131 are detachably connected to each other. One of the two connecting covers 131 is fixedly connected to the housing 11. Each connecting cover 131 defines a connecting notch 1312, and two connecting notches 1312 of the two connecting covers 131 cooperatively form the connecting hole 1301. The connecting shaft boss 211 is sandwiched between the two connecting covers 131. When mounting the rotating shell 21, the two connecting covers 131 forming the supporting arm 13 are separated from each other firstly, then the connecting shaft boss 211 is placed in one of the two connecting notches 1312 with the flange 2111 located in the avoidance space 1302, and finally the two connecting covers 131 are fixedly connected to each other by the bolt.

Furthermore, a connecting cavity 1311 is formed between the two connecting covers 131. The rotating shell 21 opens a first wire-passing hole 213 penetrating the connecting shaft boss 211, and the housing 11 opens a second wire-passing hole 112. Both the first wire-passing hole 213 and the second wire-passing hole 112 are communicated with the connecting cavity 1311. A conductive wire passing through the first wire-passing hole 213, the connecting cavity 1311, and the second wire-passing hole 112 can be used to electrically connect the control element 22 with the heat-generating element 12. In this way, the conductive wire can be prevented from being exposed to the outside. The connecting cavity 1311 can be an extension portion of the avoidance space 1302, or the connecting cavity 1311 is the avoidance space 1302.

In addition, an external power wire can be arranged on the supporting arm 13 to supply power to the control assembly 2 and the heating device 1.

Figure 9:
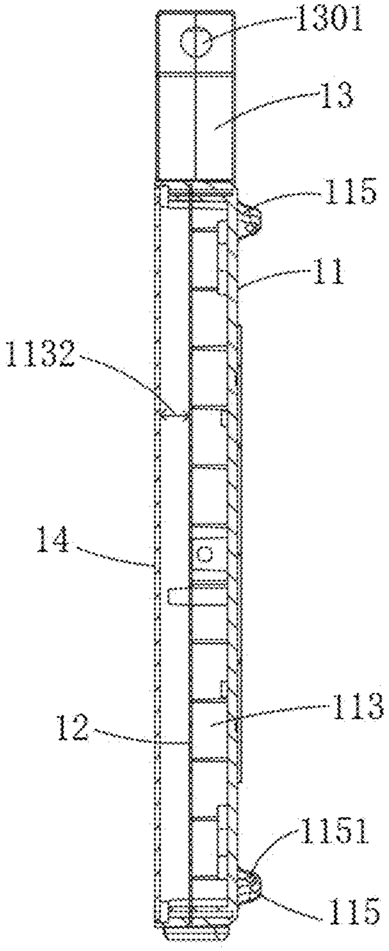
FIG. 9 is a longitudinal-section view of the heating device according to an embodiment of the present disclosure.

Furthermore, in order to prevent poultry or pets from being scalded by direct contact with the heat-generating element 12 when the heater is working, referring to FIGS. 8 and 9, in this embodiment, the heating device 1 further includes a separator 14. The housing 11 defines a heating cavity 113 and an opening 1131. The opening 1131 is located at one side of the heating cavity 113, the heat-generating element 12 is mounted in the heating cavity 113, and the separator 14 is mounted at the opening 1131. A gap 1132 is defined between the separator 14 and the heat-generating element 12. The separator 14 may be made of a heat-insulating material or metal. The separator 14 is hollowed out and has a plurality of thermal vents. Heat released by the heat-generating element 12 can pass through the separator 14. Due to the gap between the separator 14 and the heat-generating element 12, a temperature of the separator 14 may not be too high, and even if poultry or pets directly contact the separator 14, they will not be scalded, thus the separator 14 can play a protective role to poultry or pets.

In addition, the heat-generating element 12 in this embodiment may be a heating wire, a heating tube, or a heating plate with the heating wire, etc.

Figure 10:
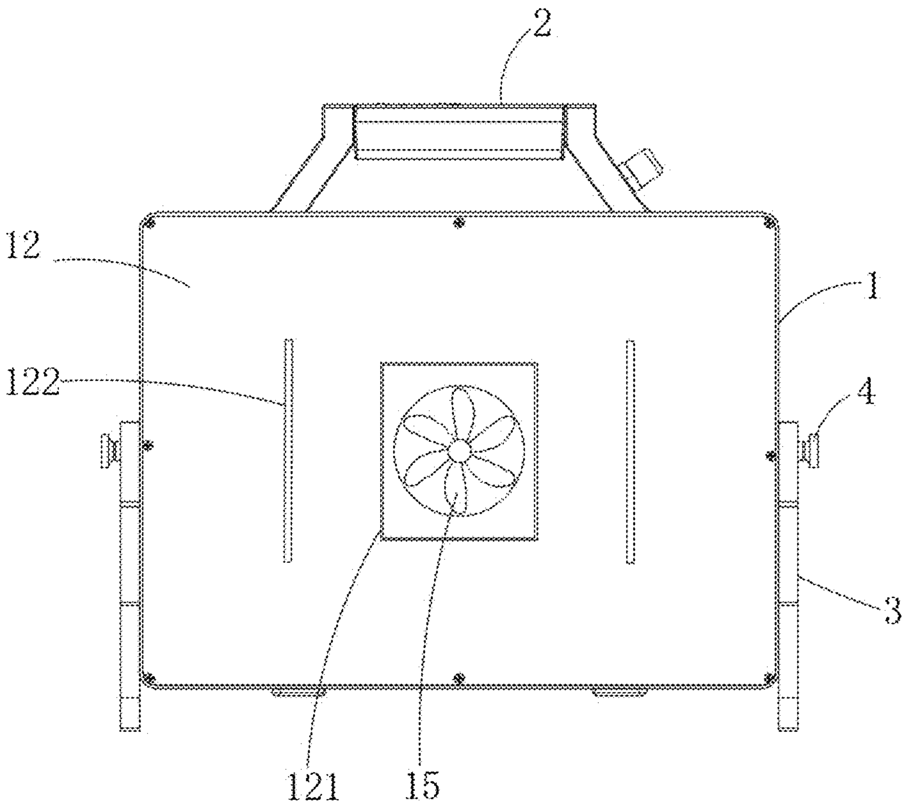
FIG. 10 is a structural view of the heating device according to an embodiment of the present disclosure, showing a blowing element.

As shown in FIG. 10, the heating device 1 further includes a blowing element 15. The heat-generating element 12 defines a mounting hole 121 and a ventilation hole 122. Each of the mounting hole 121 and the ventilation hole 122 penetrates the heat-generating element 12. Both the mounting hole 121 and the ventilation hole 122 communicate the heating cavity 113 with the outside. The blowing element 15 is located in the mounting hole 121. The blowing element 15 is electrically connected to the control assembly 2. After the heat-generating element 12 is started, air in the heating cavity 113 begins to heat up. After the blowing element 15 is started, the heated air in the heating cavity 113 can be blown to the outside, and at the same time, outside air can enter the heating cavity 113 through the ventilation hole 122 to balance an air pressure in the heating cavity 113. In this embodiment, the blowing element 15 can be used to accelerate the heating process.

In this embodiment, the heater further includes at least one bracket 3. The heating device 1 is rotatably mounted on the at least one bracket 3, and the at least one bracket 3 can be used to support on the ground. Particularly, there are two brackets 3 in the heater. The two brackets 3 can be arranged in a mirror-symmetric manner with each other. The heating device 1 is located between the two brackets 3. In this way, balance of the heating device 1 can be maintained.

Referring to FIGS. 3 and 8, in this embodiment, the heater further includes an angle adjusting member 4. A first end 41 of the angle adjusting member 4 can penetrate the bracket 3 and can be threadedly connected to the heating device 1, and a second end 42 of the angle adjusting member 4 can abut against the bracket 3. The angle adjusting member 4 may be in a form of a hand-twistable bolt. An axis of the angle adjusting member 4 forms the first rotation axis 10. In an example, there are two angle adjusting members 4. Each of the two angle adjusting members 4 penetrates a corresponding one of the two brackets 3. The two angle adjusting members 4 are coaxially arranged.

In another embodiment, a back portion of the housing 11 of the heating device 1 may define a plurality of hanging holes 114 and may be arranged with a plurality of hanging bosses 115. The hanging holes 114 may be gourd-shaped holes. Each of the plurality of hanging bosses 115 may define a threading hole 1151. In this way, the heating device 1 can be hung on the wall by ropes for use. In this embodiment, the housing 11 is approximately square or rectangular. There are four groups of hanging holes 114 and hanging bosses 115 respectively arranged at four corners of the housing 11. Particularly, each group of hanging hole 114 and hanging boss 115 is located at a corresponding corner of the housing 11. When only two groups of the hanging holes 114 and hanging bosses 115 are used to hang the heater by ropes, the heating device 1 is in the first state. When all four groups of hanging holes 114 and hanging bosses 115 are used to hang the heater by ropes, the heating device 1 is in the second state.

Obviously, the embodiments described above are only a part of the embodiments of the present disclosure, and not all of them. The accompanying drawings give some embodiments of the present disclosure, but do not limit the patentable scope of the disclosure, which may be realized in many different forms. Rather, these embodiments are provided for the purpose of providing a more thorough and comprehensive understanding of the present disclosure. Although the present disclosure has been described in detail with reference to the foregoing embodiments, it is still possible for a person skilled in the art to modify the technical solutions recorded in the foregoing specific embodiments or to make equivalent substitutions for some of the technical features therein. Any equivalent structure made by utilizing the contents of the specification and the accompanying drawings of the present disclosure, directly or indirectly applied in other related technical fields, are all the same within the scope of the patent protection of the present disclosure.

What is claimed is:

1. A heater, configured to heat an ambient environment for poultry and pets; the heater comprising a heating device and a control assembly, wherein the control assembly is rotatably arranged on the heating device;

wherein the heating device comprises a housing, a heat-generating element arranged inside the housing, and two supporting arms protruding from the housing; each of the two supporting arms comprises a connecting portion rotatably connected to the control assembly;

the control assembly is clamped between the connecting portion of one of the two supporting arms and the connecting portion of the other one of the two supporting arms;

a rotation axis of the control assembly coincides with a connection line between a center of the connecting portion of the one of the two supporting arms and a center of the connecting portion of the other one of the two supporting arms.

2. The heater as claimed in claim 1, wherein
the control assembly is electrically connected to the heat-generating element.

3. The heater as claimed in claim 2, wherein
each of the two supporting arms further comprises an extending portion, connected between the connecting portion and the housing;
the control assembly comprises a rotating shell a control element arranged on the rotating shell; the rotating shell is arranged with two connecting shaft bosses that are respectively distributed on two opposite sides of the control assembly, and one of the two connecting shaft bosses is rotatably connected to the connecting portion of the one of the two supporting arms; the other one of the two connecting shaft bosses is rotatably connected to the connecting portion of the other one of the two supporting arms;
the rotation axis of the control assembly is a rotation axis of each of the two connecting shaft bosses.

4. The heater as claimed in claim 3, wherein
each of the two connecting arms has a connecting cavity, each of the two connecting shaft bosses defines a first wire-passing hole penetrating the connecting shaft boss, the housing opens a second wire-passing hole, and each of the first wire-passing hole and the second wire-passing hole is communicated with the connecting cavity.

5. The heater as claimed in claim 3, wherein the rotating shell of the control assembly is in a shape of a column rod, and the rotating shell, the two supporting arms, and the housing jointly enclose to form a gripping space.

6. The heater as claimed in claim 1, wherein the heating device has another rotation axis, the rotation axis of the control assembly is parallel to the another rotation axis of the heating device.

7. The heater as claimed in claim 3, wherein
the connecting portion of the one of the two supporting arms is a connecting notch in which the one of the two connecting shaft bosses is rotatably received; the connecting portion of the other one of the two supporting arms is another connecting notch in which the other one of the two connecting shaft bosses is rotatably received;
the rotation axis of the control assembly, the rotation axis of each of the two connecting shaft bosses, and a connection line between a center of the connecting notch and a center of the another connecting notch coincide with each other.

8. The heater as claimed in claim 7, wherein each of the two connecting arms has a connecting cavity therein; each of the two connecting shaft bosses is arranged with a flange, and the flange is located in the connecting cavity and abuts against an inner cavity wall.

9. The heater as claimed in claim 8, wherein the rotating shell is arranged with a first limiting structure, the heating device is arranged with a second limiting structure, and the first limiting structure and the second limiting structure are mated and connected with each other and cooperatively limit a rotation angle of the connecting shaft boss.

10. The heater as claimed in claim 9, wherein the first limiting structure is a first limiting boss arranged in a circumferential direction of the connecting shaft boss, the second limiting structure is a second limiting boss located in the avoidance space, and the first limiting boss abuts against the second limiting boss.

11. The heater as claimed in claim 3, wherein the control element comprises at least one of a display panel and a control button; a plane on which the display panel and/or the control button are arranged is parallel to the rotation axis of the control assembly;
when the control assembly rotates, the display panel and/or the control button are rotated around the rotation axis of the control assembly.

12. The heater as claimed in claim 1, wherein the heat-generating element is flat and is arranged on a first plane;
the control assembly comprises a rotating shell, a display panel arranged on the rotating shell, and a control button arranged on the rotating shell; the display panel and the control button are arranged on a second plane;
the control assembly is configured to be rotated to reach a first position and a second position;
in the first position, the first plane is substantially perpendicular to the second plane; and
in the second position, the first plane is substantially parallel to the second plane.

13. The heater as claimed in claim 1, wherein the heating device further comprises a blowing element, the housing and the heat-generating element jointly enclose to form a heating cavity, the heat-generating element opens a mounting hole and a ventilation hole, each of the mounting hole and the ventilation hole penetrates the heat-generating element and communicates the heating cavity to an outside world, and the blowing element is located in the mounting hole.

14. The heater as claimed in claim 13, wherein the heating device further comprises a separator, the separator is mounted on the housing, a gap is defined between the separator and the heat-generating element, and the separator is hollowed out.

15. The heater as claimed in claim 1, further comprising at least one bracket, and the heating device is rotatably mounted on at the at least one bracket.

16. The heater as claimed in claim 15, further comprising an angle adjusting member, a first end of the angle adjusting member penetrates the heating device and is threadedly connected to the heating device, a second end of the angle adjusting member abuts against the at least one bracket, and an axis of the angle adjusting member forms a first rotation axis.

17. The heater as claimed in claim 16, wherein a number of the at least one bracket is two, a number of the angle adjusting member is two, the heating device is located between the two brackets, and each of the two angle adjusting members penetrates a corresponding one of the two brackets.

18. The heater as claimed in claim 1, wherein the heating device defines a plurality of hanging holes.

19. The heater as claimed in claim 1, wherein the heating device is arranged with a plurality of hanging bosses, and each of the plurality of hanging bosses defines an insertion hole.

* * * * *